United States Patent
Henson et al.

(10) Patent No.: US 7,307,820 B2
(45) Date of Patent: Dec. 11, 2007

(54) SYSTEMS, METHODS, AND DEVICE FOR ARC FAULT DETECTION

(75) Inventors: Jeremy Henson, Raleigh, NC (US); Carlos Restrepo, Atlanta, GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 413 days.

(21) Appl. No.: 11/154,350

(22) Filed: Jun. 16, 2005

(65) Prior Publication Data

US 2005/0286185 A1    Dec. 29, 2005

Related U.S. Application Data

(60) Provisional application No. 60/581,398, filed on Jun. 21, 2004.

(51) Int. Cl.
*H02H 3/00* (2006.01)
*H02H 9/08* (2006.01)
*H02H 7/00* (2006.01)
*G01R 31/08* (2006.01)
*G01R 31/12* (2006.01)
*H01H 9/50* (2006.01)

(52) U.S. Cl. .............................. 361/42; 361/5; 324/536
(58) Field of Classification Search .................. 361/42
See application file for complete search history.

(56) References Cited

U.S. PATENT DOCUMENTS

2003/0074148 A1 *   4/2003   Dvorak et al. ................ 702/58

* cited by examiner

*Primary Examiner*—Michael Sherry
*Assistant Examiner*—Dharti H Patel

(57) ABSTRACT

Certain exemplary embodiments described herein comprise a method comprising a plurality of activities comprising: discriminating an arcing condition from a non-arcing broadband signal, and, in response to detecting an arcing condition, outputting a trip signal to a circuit breaker controlling a predetermined alternating current circuit associated with the arcing condition.

23 Claims, 8 Drawing Sheets

SYSTEMS, METHODS, AND DEVICE FOR ARC FAULT DETECTION

CROSS-REFERENCES TO RELATED APPLICATIONS

This application claims priority to, and incorporates by reference herein in its entirety, pending U.S. Provisional Patent Application Ser. No. 60/581,398 filed 21 Jun. 2004.

BACKGROUND

U.S. Pat. No. 5,729,145 (Blades), which is incorporated by reference herein in its entirety, allegedly recites that "[a]rcing in an AC power system is detected by monitoring the power waveform for wideband high-frequency noise, and examining the detected noise for patterns of variation in its amplitude synchronized to the power waveform. A narrowband, swept-frequency detector and synchronous averaging may be employed to improve discrimination of arc noise from background interference. An arcing fault interrupter for controlling a single circuit, and a whole house monitor, for detecting arcing anywhere in a house, are described." See Abstract.

U.S. Patent Application Ser. No. 20010033469 (Mac-Beth), which is incorporated by reference herein in its entirety, allegedly recites that an "arc fault circuit interrupter (AFCI) detects arc faults by identifying the various signature patterns of arc fault noise while rejecting arc mimicking noise from normal load phenomena." See Abstract.

U.S. Pat. No. 6,459,273 (Dollar), which is incorporated by reference herein in its entirety, allegedly recites a "sputtering arc fault detector (10) for a system having an electrical conductor (14) carrying current to a load. The sputtering arc fault detector includes a current monitor (64) coupled to the conductor for generating a variable signal responsive to behavior of the current in the conductor. A level detector (58) is coupled to the monitor and generates a first pulse when the variable signal exceeds a first level. A step detector (62) is coupled to the monitor and is responsive to rapid step increases of the variable signal. The step detector generates a second pulse when the variable signal exceeds a second level. An arc verifier (48), which is coupled to the level detector and the step detector, combines the first and second pulses, and generates a fault signal when the combined pulses exceed a third level." See Abstract.

SUMMARY

Certain exemplary embodiments described herein comprise a method comprising a plurality of activities comprising: discriminating an arcing condition from a non-arcing broadband signal, and, in response to detecting an arcing condition, outputting a trip signal to a circuit breaker controlling a predetermined alternating current circuit associated with the arcing condition.

BRIEF DESCRIPTION OF THE DRAWINGS

A wide variety of potential embodiments will be more readily understood through the following detailed description of certain exemplary embodiments, with reference to the accompanying exemplary drawings in which.

DEFINITIONS

Figure 1:
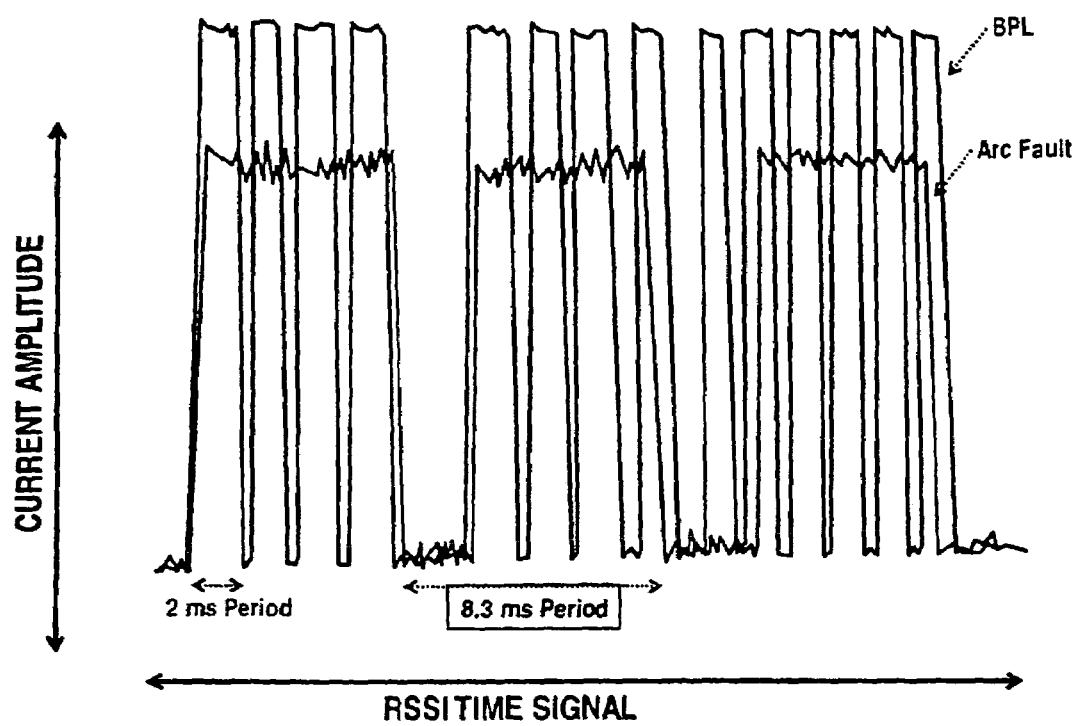
FIG. 1 is a plot of signal strength waveforms generated by both an exemplary arc fault condition and by an exemplary BLP condition, and showing that BPL signal waveforms can mimic arc fault generated waveforms due to the signal strength and periodicity similarities.

When the following terms are used herein, the accompanying definitions apply:

a—at least one.

activity—an action, act, step, and/or process or portion thereof.

adapted to—made suitable or fit for a specific use or situation.

alternating current—an electric current that reverses direction in a circuit at regular intervals.

amplitude—a magnitude of a variable.

apparatus—an appliance or device for a particular purpose arc fault—a discharge of electricity between two or more conductors, the discharge associated with at least a predetermined voltage, current, and/or power level.

arcing condition—a set of occurrences evidencing an actual arc fault.

assign—designate.

broadband—within a frequency band of approximately 10 kHz to approximately 1 GHz, including all values and subranges therebetween.

broadband-over-power line (BPL)—a technology that employs power lines as a communication medium for high speed data transfer.

can—is capable of, in at least some embodiments.

characterize—to describe the qualities or peculiarities of and/or to classify.

circuit—an electrically conducting pathway.

circuit breaker—a device adapted to automatically open an alternating current electrical circuit.

compare—to examine in order to note the similarities or differences of.

comprising—including but not limited to.

connect—to join or fasten together.

coupleable—capable of being joined, connected, and/or linked together.

coupling—linking in some fashion.

data—distinct pieces of information, usually formatted in a special or predetermined way and/or organized to express concepts.

define—to establish the outline, form, or structure of.

detect—to sense, perceive, and/or identify.

discriminate—to distinguish.

disturbance—a deviation, such as a deviation occurring in sinusoidal waveform.

down-convert—transforming a signal from a higher frequency band to an intermediate frequency band.

duration—a measure of a period over which something occurs and/or exists.

falling edge—a trailing face and/or border.

frequency—the number of times a specified periodic phenomenon occurs within a specified interval.

gap—an interruption of continuity; a space between objects and/or events.

generate—to create.

identifier—a group of symbols that are unique to a particular sample, entity, and/or activity.

information device—any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise well-known components such as one or more network interfaces, one or more processors, one or more memories containing instructions, and/or one or more input/output (I/O) devices, one or more user interfaces coupled to an I/O device, etc.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

instructions—directions adapted to perform a particular operation or function.

intermediate frequency (IF)—a frequency to which an incoming signal is converted for ease of handling and/or processing.

machine readable medium—a physical structure from which a machine can obtain data and/or information. Examples include a memory, punch cards, etc.

maximum—out of a sequence of data points, the data point having the largest magnitude as measured along the non-time axis; a measure of the magnitude of such a data point.

may—is allowed to, in at least some embodiments.

mean—average; a value obtained by dividing the sum of a set of quantities by the number of quantities in a set.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

network—a communicatively coupled plurality of nodes.

network interface—any device system, or subsystem capable of coupling an information device to a network. For example, a network interface can be a telephone, cellular phone, cellular modem, telephone data modem, fax modem, wireless transceiver, Ethernet card, cable modem, digital subscriber line interface, bridge, hub, router, or other similar device.

number—a count.

open—to interrupt.

output—to provide.

plurality—the state of being plural and/or more than one.

predetermined—established in advance.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

radio frequency (RF)—a frequency in the range within which radio waves may be transmitted, from about 3 kilohertz to about 300,000 megahertz.

relate—to connect to and/or associate with.

rising edge—a leading face and/or border.

sample—noun: a set of elements drawn from and analyzed to estimate the characteristics of a population; verb: to take a sample of.

score—noun: a numerical value resulting from an evaluation with respect to a predetermined criterion; verb: to evaluate with respect to a predetermined criterion.

sense—to detect or perceive automatically.

sequential—ordered in time.

set—a related plurality.

signal—detectable transmitted energy, such as an impulse or a fluctuating electric quantity, such as voltage, current, or electric field strength.

signal strength—a measure of an energy content of a signal.

slope—a measure of a degree of inclination.

statistical amplitude measure—a true, local, weighted, and/or running maximum, minimum, median, mean, and/or mode, etc.

steep—having a sharp inclination; precipitous.

store—to place, hold, and/or retain data, typically in a memory.

substantially—to a great extent or degree.

system—a collection of mechanisms, devices, data, and/or instructions, the collection designed to perform one or more specific functions.

time interval—the amount of time between two specified instants, events, and/or states.

transmit—to convey (force or energy) from one place and/or thing to another.

trip—to open an electrical circuit; to automatically interrupt current flow in an electrical circuit.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

DETAILED DESCRIPTION

Certain exemplary embodiments comprise a method comprising: repeatedly, for a predetermined one of a predetermined number of sequential time intervals, determining a statistical amplitude measure of all sequential samples of a indication signal related to a broadband signal corresponding to a predetermined sample identifier in all of the predetermined number of sequential time intervals and storing that statistical amplitude measure; repeatedly, for each sample identifier, determining a statistical amplitude value of all stored statistical amplitude measures associated with the predetermined number of time intervals and storing that statistical amplitude value; for a computed signal comprised of at least a portion of the stored statistical amplitude values, detecting an arcing condition; and outputting a trip signal to a circuit breaker controlling a predetermined alternating current circuit associated with the broadband signal.

Certain exemplary embodiments can provide broadband RF communication interference reduction and/or arc fault detection improvement by implementing synchronous signal processing methods.

Low amperage series-arcing in AC power systems can be distinguished from non-arcing conditions through the measurement of broadband RF energy content generated by the fault. One or more technologies called "broadband-over-power line" (BPL) can employ the power lines as a communication medium for high-speed data transfer. BPL can be capable of adapting to the variable conditions present in a power line network to maximize data throughput. This adaptability can be reflected in the RF pattern generated by the BPL network and in general such patterns can look similar to arc fault generated conditions. Thus, BPL can operate in the range of interest that the RF arc fault detectors operate and the dynamic nature of BPL can mimic, with great approximation, the presence of arc faults.

Certain exemplary embodiments can:
1) attempt to discriminate the effects of BPL signals by either detecting their presence or by attenuating them versus the presence of true arc fault signals
2) be used to accurately to discriminate between arcing and non-arcing conditions in AC power systems, particularly non-arcing conditions that can be described as Broadband RF signals and/or BPL signals;
3) attenuate or discriminate those signals considered to be non-arc fault generated;
4) avoid falsely identifying non-arcing conditions, such as BPL conditions, as arcing conditions and/or arcing conditions as non-arcing conditions;
5) improve, via a relatively simple signal processing scheme, the discrimination of arcing and non-arcing conditions related to the presence of broadband RF signals present in the power line versus true arcing conditions.

BPL Signal Characteristics

BPL signals can be characterized for being broadband in frequency content and/or dynamic in nature. The conditions of the power line as a transmission line can be extremely variable and/or inefficient to say the least. In order for BPL technology to overcome these types of challenges, the designers of BPL have typically resorted to dynamic transmission strategies, such as OFDM schemes, to improve data throughput.

BPL transmission strategies in general follow the trend of transmitting data in a pulsed manner, meaning that they typically broadcast data packets and then wait for a period of time before transmitting the next set of packets. The broadcast time can be determined by the amount of data allowed in the transmission frame, which can be determined by the convention and/or communication protocol.

In some instances, these BPL conditions (broadband RF content and/or transmissions pulsed at approximately 60 Hz and/or multiples thereof) can be enough to mimic arc faults.

FIG. 1 is a plot of signal strength waveforms generated by both an exemplary arc fault condition and by an exemplary BLP condition, and showing that BPL signal waveforms can mimic arc fault generated waveforms due to the signal strength and periodicity similarities.

Sensor and RF Hardware

In certain exemplary embodiments, the overall sensor structure can be similar to that disclosed in Blades (U.S. Pat. No. 5,729,145). The RF signal can be picked up from an AC branch through an RF sensor, which can be an E-core shape ferrite sensor. The signal can be mixed with an oscillating carrier. This operation help guarantee that only broadband RF signals will become relevant. The signal, once mixed with the carrier, can be filtered and amplified. The signal energy level can be measured, quantified, and/or represented with a corresponding signal intensity level. For example, the broadband and/or RF signal can be down-converted to an intermediate frequency (IF) (which can be a precise frequency that can be generated via heterodyne with a local oscillator signal to which other related circuits can be tuned) and a signal can be generated that represents and/or indicates the signal energy (strength) level of the broadband and/or RF signal in at that IF. The newly generated signal can be called a received signal strength indication (RSSI) signal. Typically, this RSSI signal will represent those conditions that are truly broadband in nature, like arc fault conditions and/or other potential sources of broadband information broadcasting in an AC circuit branch.

Mixed-Signal Microprocessor

This portion can comprise a mixed-signal microprocessor with Analog-to-Digital conversion (A/D) capabilities. The microprocessor can be selected based on the algorithm implementation requirements.

Functional Operation

The microprocessor A/D input can be driven by a variable signal that represents broadband RF signal strength (energy) originated potentially by an arc fault. At this point the manipulation of the data obtained from the A/D converter can be divided in two major functionality blocks.

BPL Attenuation/Filtering—Synchronous Maximization Method

Certain exemplary embodiments can attenuate the presence of any signal that could potentially be considered related to an arc fault but does not comply with certain predetermined overall criteria.

Certain exemplary embodiments can utilize synchronizing windows of gathered data and overlap them and gather the average and/or mean of each position in the window. The result can potentially allow only those repetitive traits synchronized with the AC line and/or related to the AC line to add constructively and those without that relationship can destruct. Test results show that there is not necessarily a need to synchronize the windowed analysis with the AC line.

The sampling frequency can be in the range of approximately 5 kHz to approximately 100 kHz or greater, including all values and subranges therebetween. The window size can be determined based on the sampling rate and/or the periodicity of the AC line. For example, the window size can be calculated as the sampling frequency divided by 2 times the AC line frequency. Thus, for a sampling frequency of 25 kHz and an AC line frequency of 60 Hz, the number of samples in a window can be approximately 208.

The number of windows used can depend on the design timing constraints, and can typically range from approximately 3 to approximately 20 windows. The more windows implemented the more the results can rely on a large number of samples and/or the more accurate the results. The less windows implemented, the quicker the results and/or the more failsafe the technique, where a failsafe technique is considered to be one that trips the circuit rapidly, even if sometimes unnecessarily and/or prematurely.

To filter the presence of signals not synchronized to the AC line, the algorithm can look for the maximum amplitude of the samples of each time position across all the chosen number of windows. Typically, only those amplitudes that are synchronized (periodic) to the AC line will pass through with minimal attenuation.

A second stage with the same concept can be used where instead of the maximum value, the algorithm looks for the average and/or mean of all the windows timing positions. This second stage can help attenuate any upstanding presence of BPL generated signals.

Figure 2:
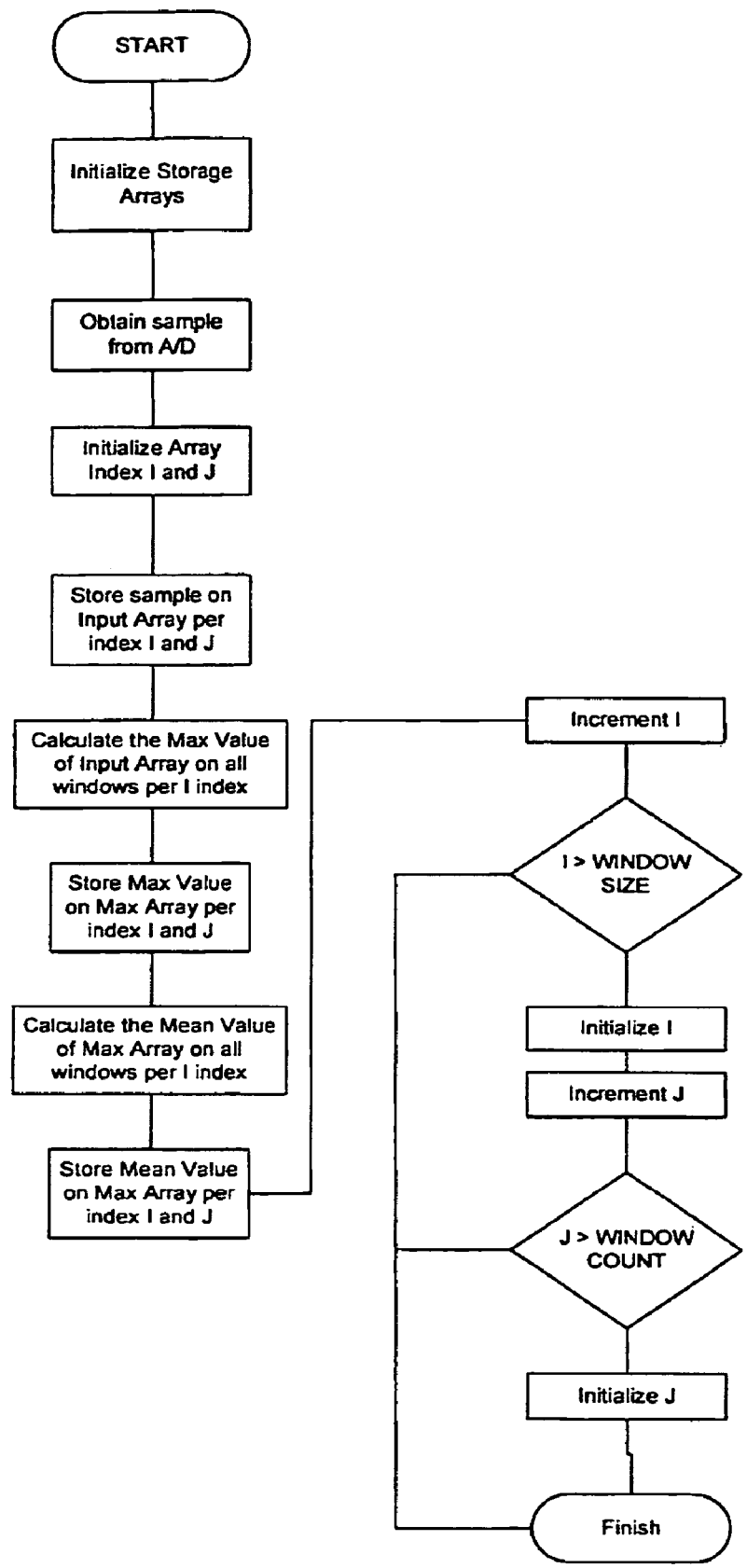
FIG. 2 is a flow chart of an exemplary embodiment of a BPL Attenuation/Filtering method.

FIG. 2 is a flow chart of an exemplary embodiment of a BPL Attenuation/Filtering method. Note that sample data can be stored in at least an input storage array, that maximum (or mean) values of the input storage arrays for a particular sample identifier for a predetermined number of windows can be stored in a maximum (or mean) value storage array, and that mean values of the maximum (or mean) value storage arrays can be stored in a mean value storage array and/or vector.

Figure 3:
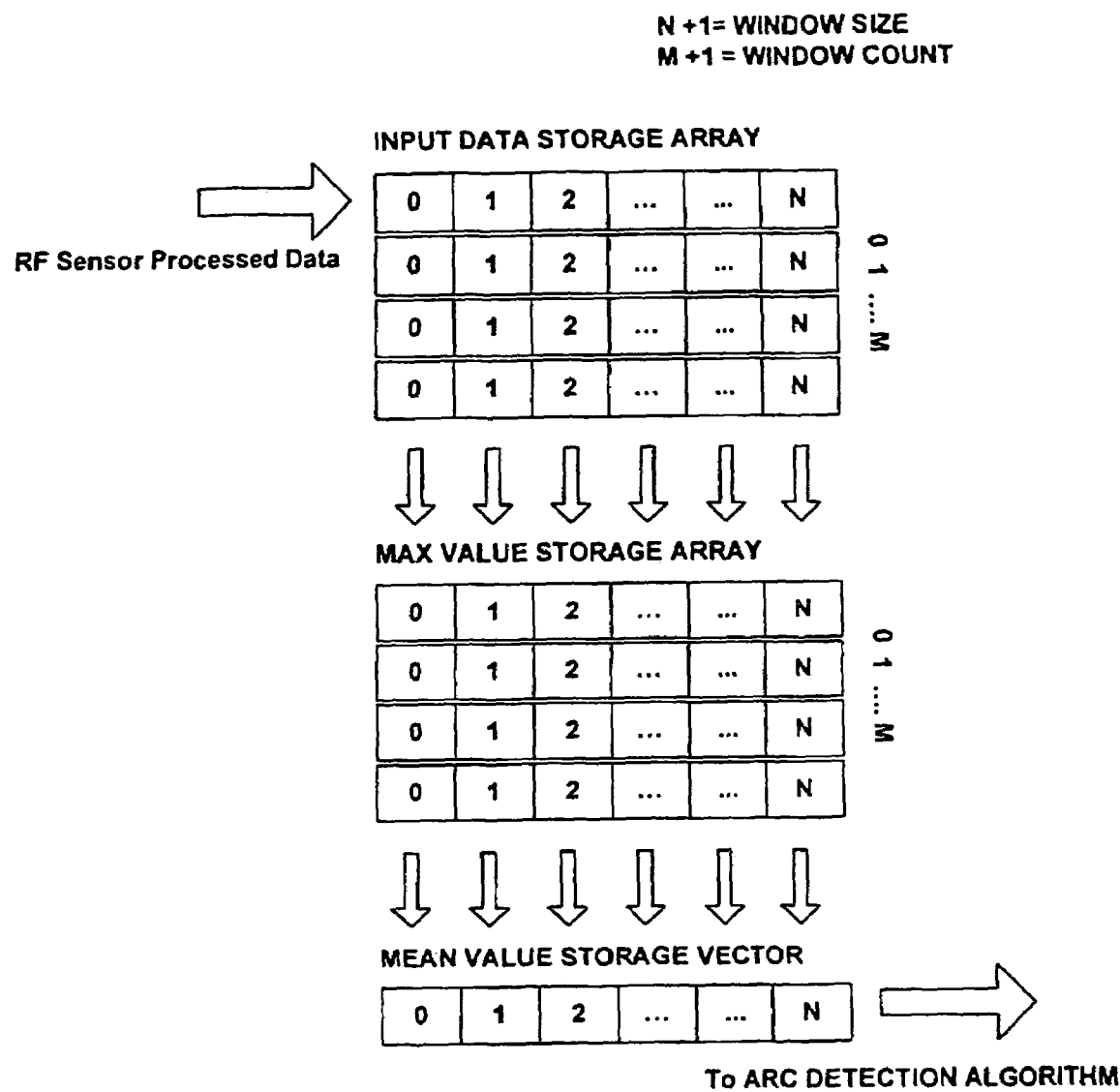
FIG. 3 is a data path diagram of an exemplary embodiment of a BPL Attenuation/Filtering method.

FIG. 3 is a data path diagram of an exemplary embodiment of a BPL Attenuation/Filtering method, such as that represented in FIG. 2. As another method of visualizing an exemplary embodiment of this method, consider the data of Table 1, below, which considers sample identifier 1 across 4 windows at 8 points in time:

TABLE 1

| | Time | | | | | | | |
|---|---|---|---|---|---|---|---|---|
| | ...t = 1 | t = 2 | t = 3 | t = 4 | t = 5 | t = 6 | t = 7 | t = 8 |
| RSSI amplitude | ...0 | 0 | 0 | 1 | 0 | 0 | 0.5 | 0 |
| Maximum (4 window) | ...0 | 0 | 0 | 1 | 1 | 1 | 1 | 0.5 |
| Mean of max's (4 window) | ...0 | 0 | 0 | 0.25 | 0.50 | 0.75 | 1.0 | 0.875 |

Figure 4:
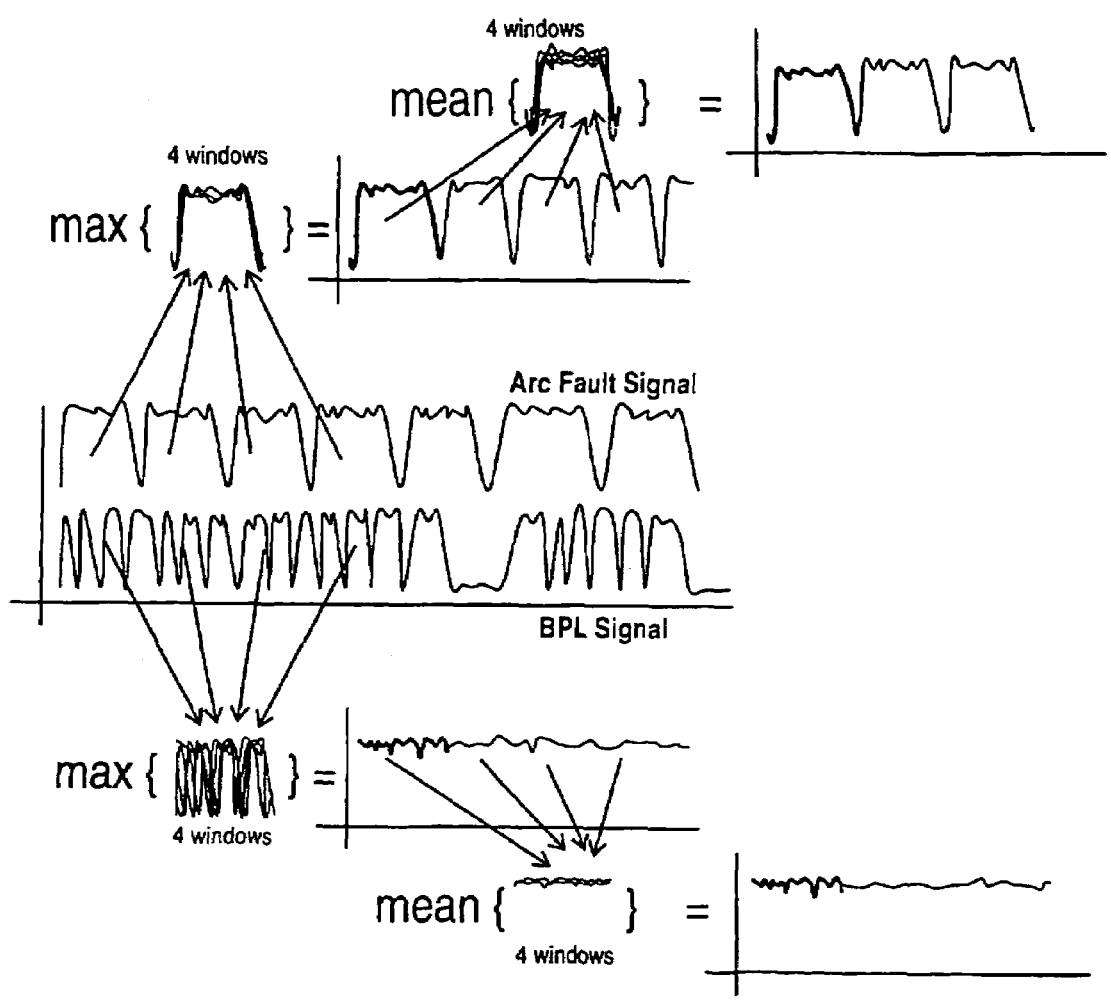
FIG. 4 is a data manipulation schematic for an exemplary embodiment of a Synchronous Signal Processing method.

FIG. 4 is a data manipulation schematic for an exemplary embodiment of a Synchronous Signal Processing method. In this illustrated exemplary embodiment, the number of windows is chosen as 4. Note also that because the BPL signal is not synchronized over all the chosen windows with the periodicity of the AC signal, the maximum value signal, curve, and/or plot of the BPL-related samples do not reflect such a periodicity. In contrast, the maximum value signal, curve, and/or plot of the Arc Fault-related signal does reflect such a periodicity, as shown be the steep rises and falls occurring with a periodicity related to the periodicity of the AC signal.

Arc Fault Detection

Once the signal has been processed by the BPL attenuation block then certain exemplary embodiments can discriminate the signal further to determine the presence of arc fault conditions.

Figure 5:
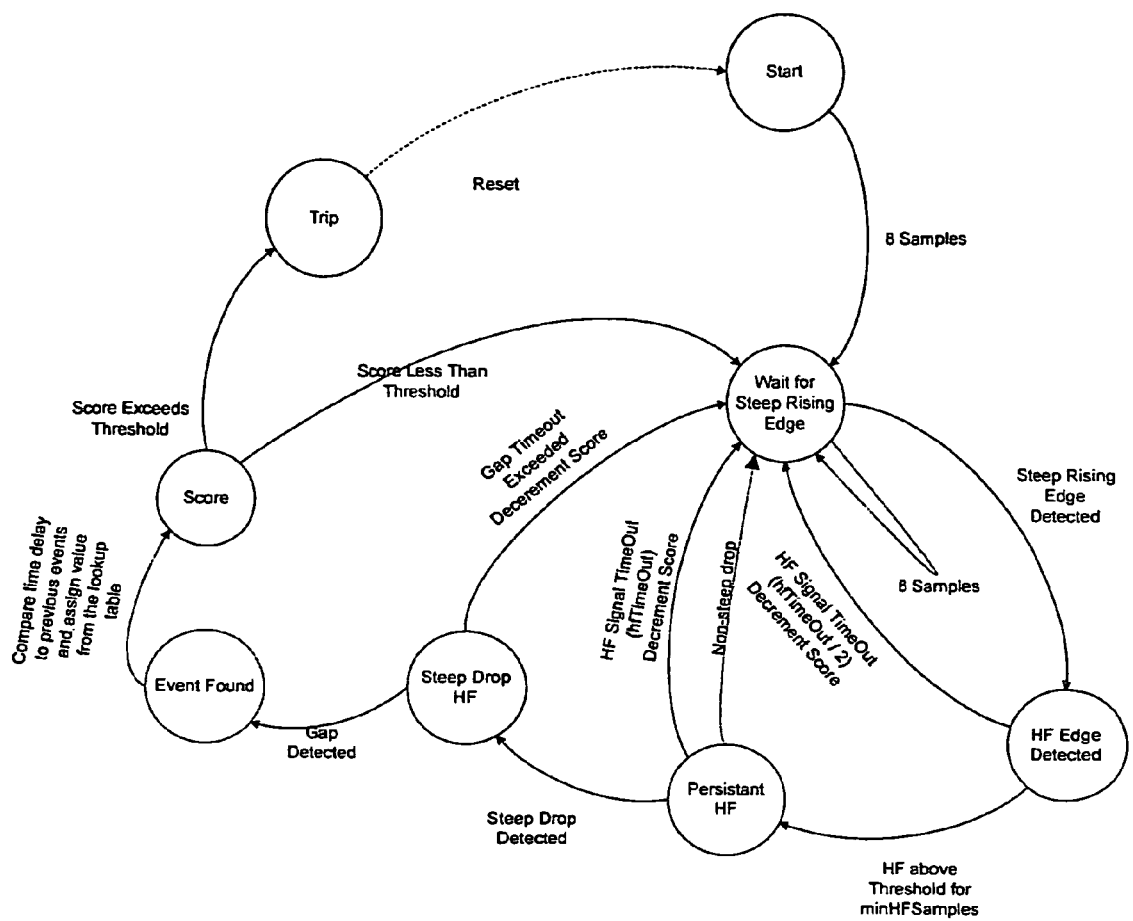
FIG. 5 is a flow chart of an exemplary Arc Fault Detection method.

FIG. 5 is a flow chart of an exemplary Arc Fault Detection method. FIG. 5 illustrates an exemplary state machine that can describes the operation of this portion of certain exemplary embodiments of the system. The system can look at particular traits of the signal at different moments in time based on the state the detection process is in.

The algorithm can focus on examining the characteristics outlined by the waveform shown in FIG. 1. Arc faults tend to generate a periodic waveform with high shoulders separated by approximately 8.33 milliseconds and/or approximately 120 Hz (half-cycle relationship of an 60 Hz AC line circuit). We have formulated an algorithm that can looks at this characteristic in sequence and can use the presence of this conditions as a toll-gate evaluation to advance in the detection state machine.

The initial and/or idle state of the state machine can be that of waiting for a steep rise stage. A first condition that can be met is that the arcing "event" in question starts with a steep rise. This steep rising edge can be detected by different methods like slope detection and/or curve-fitting techniques.

A second condition can be to look for enough of a persistent presence of RF signal in the AC line. In other words, the method can quantify how long the event signal maintains an amplitude value above a detection threshold and this duration can be compared with a minimum time duration value.

A third condition can be that the event shows a steep drop trend and/or a steep falling edge. The same analysis used for the steep rise condition can be used to determine this condition.

The fourth condition can be to find a "gap" between events that last more than a minimum time requirement.

Once an arc event has been found based on any combination of the four criteria mentioned above, there can be employed a scoring approach based on the relationship between events. In other words the system can compare events found and assign a score to their timing relationship. If the events are approximately 8.33 milliseconds apart the score can be considered high and recorded. A high relationship between events in a repetitive fashion can lead to a trip signal that can engage a solenoid device that will mechanically trip the breaker.

Certain exemplary embodiments can:
1) be implemented via microprocessor utilizing software, and/or as a mixed signal ASIC;
2) include the ability to detect high amperage parallel arcing; and/or
3) be added and/or incorporated to an AFCI device and/or any device that is designed to accurately identify arcing and non-arcing conditions.

Figure 6:
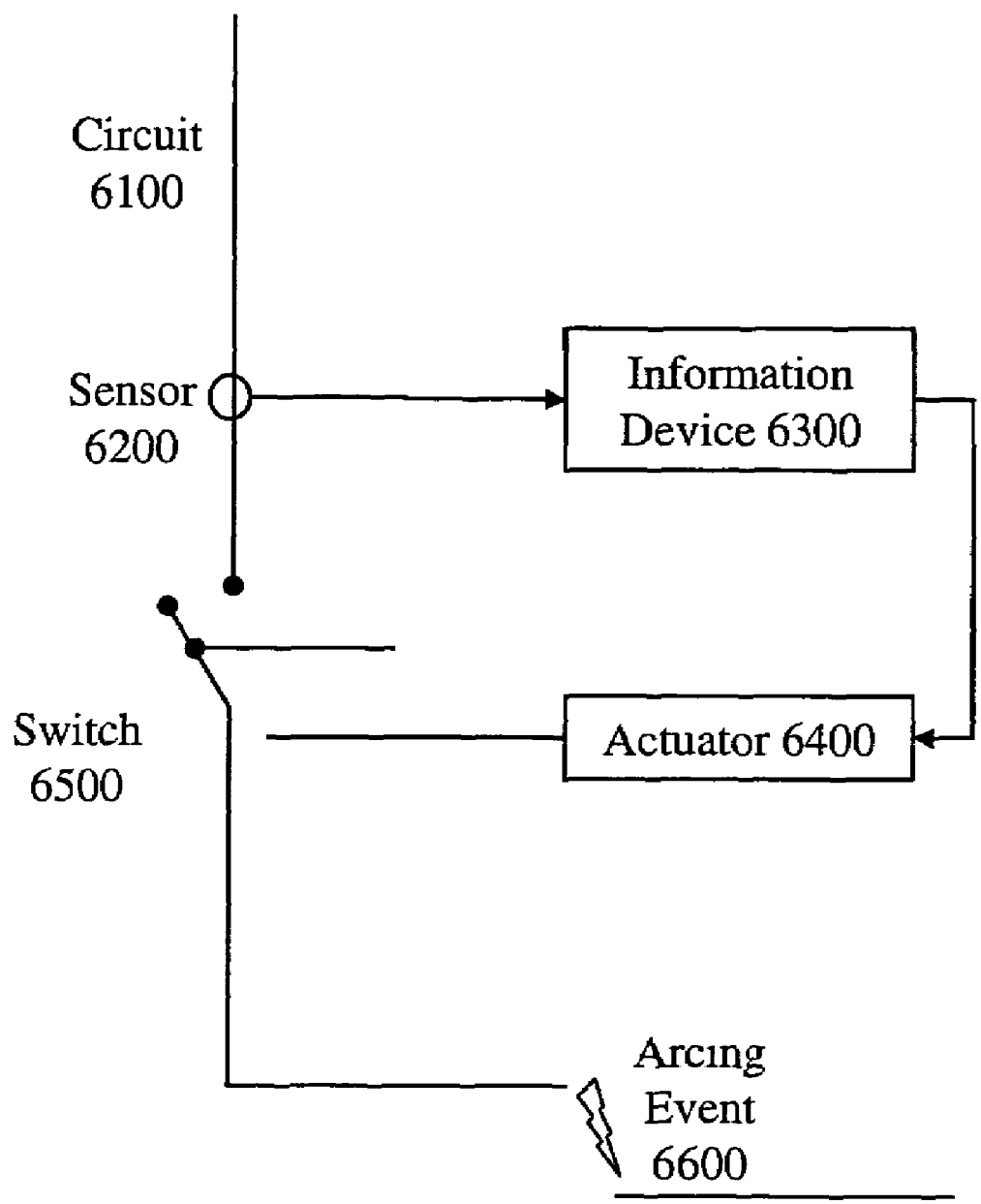
FIG. 6 is a block diagram of an exemplary embodiment of a system 6000.

FIG. 6 is a block diagram of an exemplary embodiment of a system 6000, which can comprise a circuit 6100, an alternating current through which can be sensed and/or detected by sensor 6200. A signal from sensor 6200 can be provided to information device 6300 for processing. Prior to and/or at information device 6300, the signal can be digitized and/or sampled. At information device 6300, the resulting digital data can be analyzed to identify, for example, one or more amplitude-duration pairs, which can be compared to predetermined criteria to determine whether to score the pair and/or the event it represents. A cumulative and/or group score can be determined and/or assessed for a plurality of related data, such as data representative of a plurality of events and/or a condition. The assessment can result in a determination and/or discrimination of a type of condition associated with the plurality of related data, amplitude-duration pairs, and/or events. Based on a signal generated by information device 6300, such as in response to a determination and/or detection of an arcing event 6600 and/or an arcing condition, and/or detection of a hazardous arcing condition, an actuator 6400 can cause a switch 6500 to interrupt circuit 6100. Switch 6500 can be a circuit breaker, such as an AFCI.

Figure 7:
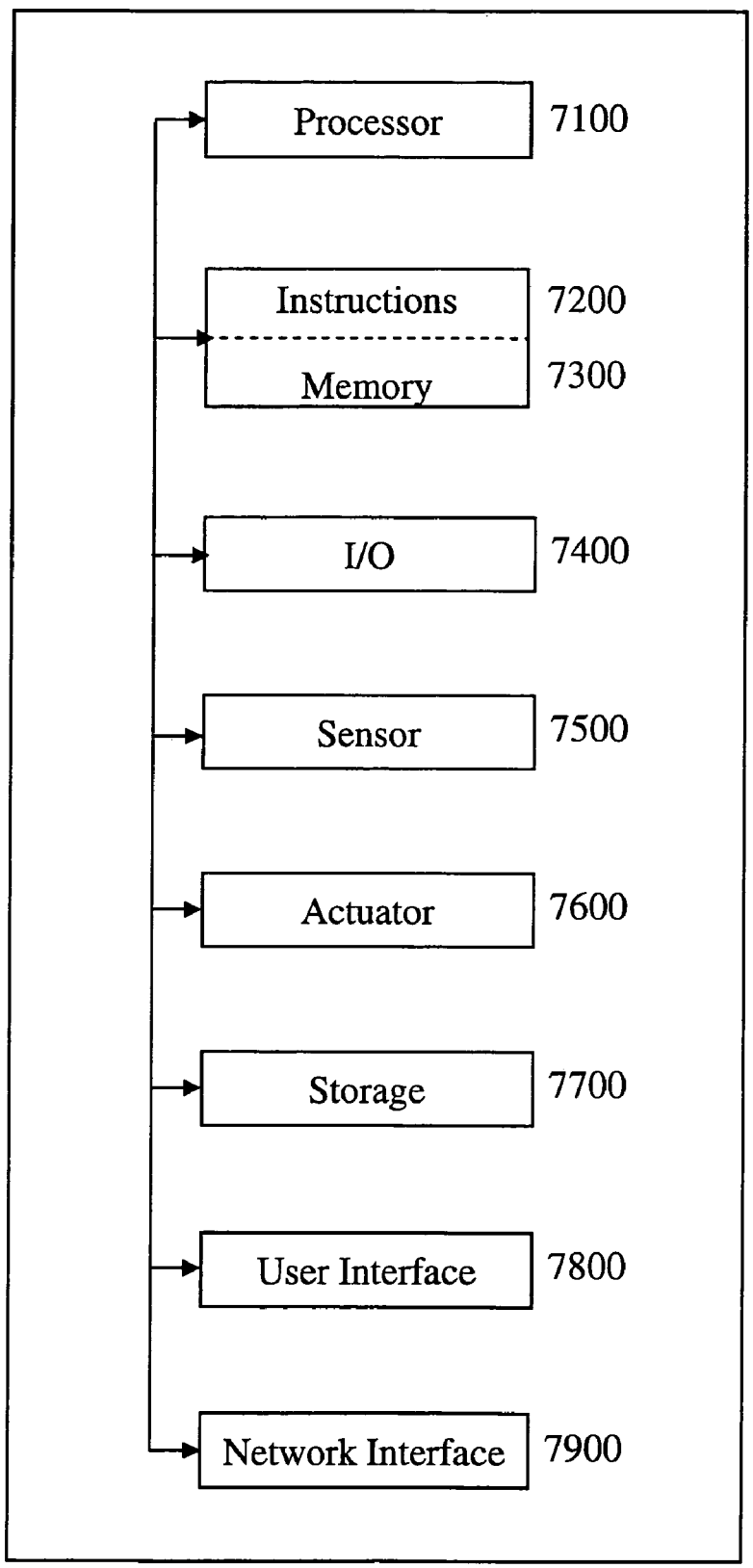
FIG. 7 is a block diagram of an exemplary embodiment of an information device 7000.

FIG. 7 is a block diagram of an exemplary embodiment of an information device 7000, which in certain operative embodiments can comprise, for example, information device 6300 of FIG. 6. Information device 7000 can comprise and/or be coupled to any of numerous well-known components, such as for example, one or more processors 7100, one or more instructions 7200 stored in one or more memories 7300, one or more input/output (I/O) devices 7400, one or more sensors 7500, one or more actuators 7600, one or more storage devices 7700, one or more user interfaces 7800, and/or network interfaces 7900, etc.

In certain exemplary embodiments, detection of an arcing condition can result in a notification of that fact being presented via a graphical user interface 7800. Information related to signals, amplitude-duration pairs, arcing and/or non-arcing events and/or conditions, and/or responses thereto, etc., can be logged, archived, and/or analyzed to, for example, avoid hazards, determine causes, spot patterns, detect trends, and/or perform predictive and/or preventive maintenance, etc.

Figure 8:
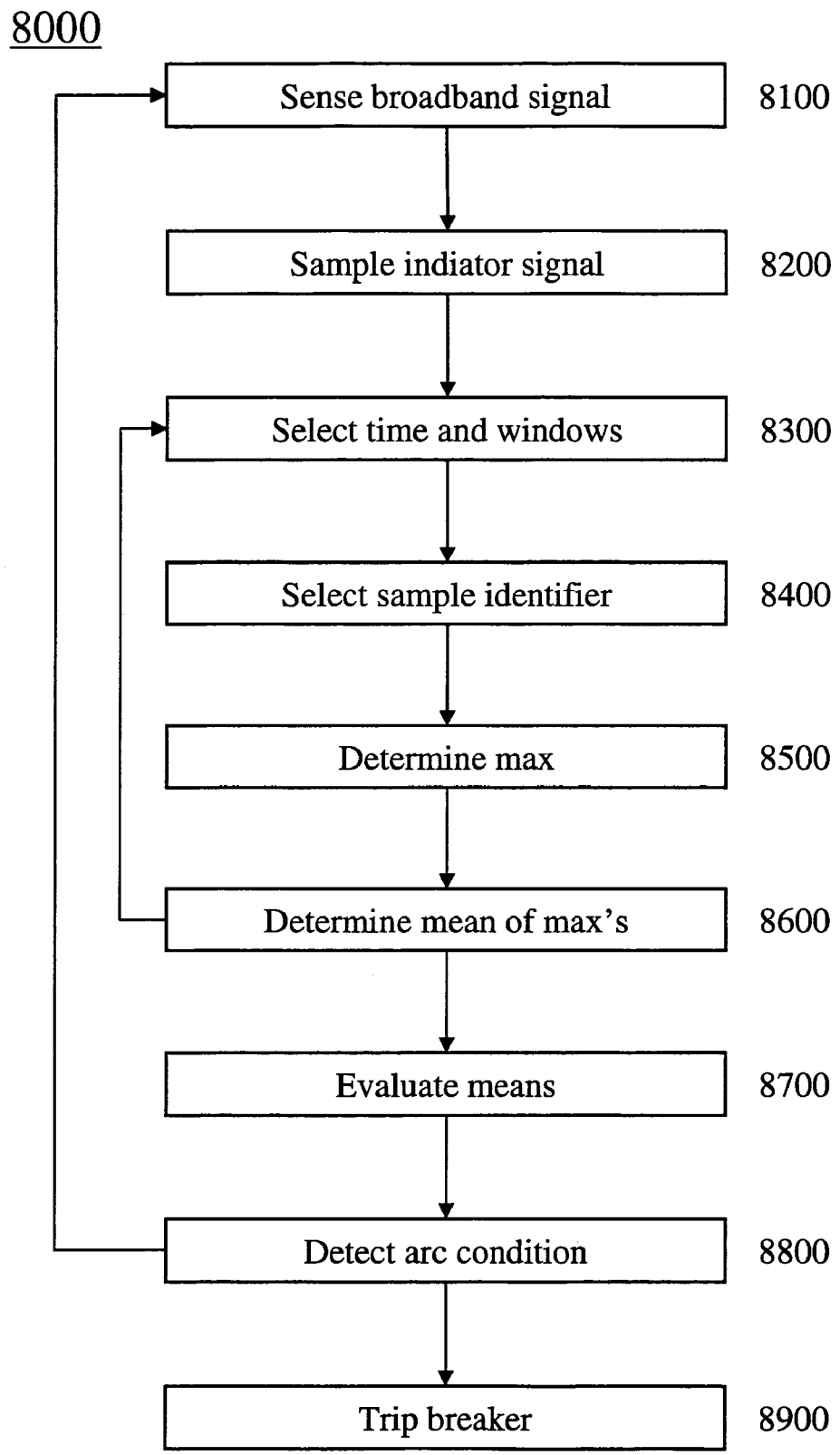
FIG. 8 is a flowchart of an exemplary embodiment of a method 8000.

FIG. 8 is a flowchart of an exemplary embodiment of a method 8000. At activity 8100, a broadband signal, such as a broadband signal carried on an AC line signal, is sensed and/or detected. At activity 8200, an indicator signal, such as an RSSI signal, is sampled. At activity 8300, a time, and a predetermined number of time intervals and/or windows associated with that time, are selected. At activity 8400, a sample identifier is selected. At activity 8500, for the given time and sample identifier, a maximum amplitude value is determined across the given number of time intervals and/or windows. At activity 8600, for the given time and sample identifier, a mean amplitude value is determined across the given number of time intervals and/or windows. At activity 8700, the means are evaluated. At activity 8800, a potential arcing condition is detected. At activity 8900, responsive to detecting the potential arcing condition, a circuit breaker is tripped and/or a circuit is interrupted.

The following published United States Patent documents are incorporated herein by reference in their entirety:
U.S. Pat. Nos. 5,729,145; 6,031,699; 6,259,996; 6,417,671; 6,459,273;
20010033469; 20020033701; 20030099070; and 20040066593.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, such as via an explicit definition, there is no requirement for the inclusion in any claim herein (or of any claim of any application claiming priority hereto) of any particular described or illustrated characteristic, function, activity, or element, any particular sequence of activities, or any particular interrelationship of elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A method comprising:
   sensing a broadband RF signal within an alternating current signal transmitted on a predetermined alternating current circuit;
   down-converting the sensed broadband RF signal to an intermediate frequency;
   generating a received signal strength indication signal representative of a signal strength of the sensed broadband RF signal at the intermediate frequency;
   sampling the received signal strength indication signal at a predetermined sample frequency;
   repeatedly, for a predetermined one of a predetermined number of sequential time intervals, each time interval corresponding to a predetermined number of sequential received signal strength indication signal samples, each sample from the predetermined number of samples assigned a sample identifier, for each sample identifier, determining a maximum amplitude of all samples corresponding to that sample identifier in all of the predetermined number of sequential time intervals and storing that maximum amplitude;
   repeatedly, for the predetermined number of time intervals, for each sample identifier, determining a mean amplitude of all stored maximum amplitudes associated with the predetermined number of time intervals and storing that mean amplitude;
   repeatedly, for a computed signal comprised of each of the stored mean amplitudes, detecting a predetermined number of disturbances, each disturbances characterized by a steep rising edge and a steep falling edge;
   characterizing the broadband RF signal as related to an arcing condition if a gap between a steep falling edge associated with a disturbance of a first predetermined number and a steep rising edge associated with a disturbance of a second predetermined number exceeds a predetermined value;
   opening the predetermined alternating current circuit if the characterized broadband RF signal is related to an arcing condition.

2. A method comprising:
   repeatedly, for a predetermined one of a predetermined number of sequential time intervals, each time interval corresponding to a predetermined number of sequential samples of an indication signal related to a sensed broadband signal within an alternating current signal transmitted on a predetermined alternating current circuit, each sample from the predetermined number of samples assigned a sample identifier, for each sample identifier, determining a statistical amplitude measure of all samples corresponding to that sample identifier in all of the predetermined number of sequential time intervals and storing that statistical amplitude measure;
   repeatedly, for the predetermined number of time intervals, for each sample identifier, determining a mean amplitude value of all stored statistical amplitude measures associated with the predetermined number of time intervals and storing that mean amplitude value;
   for a computed signal comprised of each of the stored mean amplitude values, detecting an arcing condition; and
   outputting a trip signal to a circuit breaker controlling the predetermined alternating current circuit.

3. The method of claim 2, further comprising:
   sensing the broadband signal.

4. The method of claim 2, further comprising:
   down-converting the sensed broadband signal to a predetermined intermediate frequency.

5. The method of claim 2, further comprising:
   generating a received signal strength indication signal representative of a signal strength of the sensed broadband signal at a predetermined frequency.

6. The method of claim 2, further comprising:
   sampling the indication signal.

7. The method of claim 2, further comprising:
   sampling the indication signal at a predetermined sampling frequency.

8. The method of claim 2, further comprising:
   discriminating a BPL signal.

9. The method of claim 2, further comprising:
   detecting a predetermined disturbance in the computed signal.

10. The method of claim 2, further comprising:
    detecting a duration of a predetermined disturbance in the computed signal.

11. The method of claim 2, further comprising:
    detecting a predetermined number of disturbances in the computed signal.

12. The method of claim 2, further comprising:
    detecting a rising edge of a disturbance in the computed signal.

13. The method of claim 2, further comprising:
    detecting a falling edge of a disturbance in the computed signal.

14. The method of claim 2, further comprising:
    detecting a slope of the computed signal.

15. The method of claim 2, further comprising:
    detecting a duration between predetermined disturbances in the computed signal.

16. The method of claim 2, further comprising:
    detecting a duration of a gap between predetermined disturbances in the computed signal.

17. The method of claim 2, further comprising:
    comparing a gap between predetermined disturbances in the computed signal to a predetermined criteria.

18. The method of claim 2, further comprising:
    scoring a gap between predetermined disturbances in the computed signal.

19. The method of claim 2, further comprising:
causing the predetermined alternating current circuit to trip.

20. The method of claim 2, wherein for each sample identifier, the statistical amplitude measure is an average amplitude value of all samples corresponding to that sample identifier for the predetermined number of time intervals.

21. The method of claim 2, wherein for each sample identifier, the statistical amplitude measure is a maximum amplitude value of all samples corresponding to that sample identifier for the predetermined number of time intervals.

22. The method of claim 2, wherein the broadband signal is a radio frequency signal.

23. A system comprising:
a statistical amplitude processor module adapted to, repeatedly, for a predetermined one of a predetermined number of sequential time intervals, each time interval corresponding to a predetermined number of sequential samples of a indication signal related to a sensed broadband signal carried on an alternating current signal transmitted on a predetermined alternating current circuit, each sample from the predetermined number of sequential samples assigned a sample identifier, for each sample identifier, determine a statistical amplitude measure of all samples corresponding to that sample identifier in all of the predetermined number of sequential time intervals and storing that statistical amplitude measure;

a mean amplitude processor module adapted to, repeatedly, for the predetermined number of time intervals, for each sample identifier, determine a mean amplitude value of all stored statistical amplitude measures associated with the predetermined number of time intervals and storing that mean amplitude value;

a detector adapted to, for a computed signal comprised of each of the stored mean amplitude values, detect an arc event; and a signal generator adapted to output a trip signal to a circuit breaker controlling the predetermined alternating current circuit.

* * * * *